UNITED STATES PATENT OFFICE.

DAVID MOSHER, OF SAN FRANCISCO, CALIFORNIA, ASSIGNOR TO AMMONIA CYANIDE ENGINEERING COMPANY, OF SAN FRANCISCO, CALIFORNIA, A CORPORATION OF CALIFORNIA.

AMMONIA-CYANID PROCESS OF TREATING ORES CONTAINING PRECIOUS METALS.

No. 911,254.   Specification of Letters Patent.   Patented Feb. 2, 1909.

Application filed September 4, 1907. Serial No. 391,373.

*To all whom it may concern:*

Be it known that I, DAVID MOSHER, a citizen of the United States, residing at the city and county of San Francisco and State of California, have invented certain new and useful Improvements in Ammonia-Cyanid Process of Treating Ores Containing Precious Metals, of which the following is a specification.

My invention relates to the treatment of ores and tailings with ammonia-cyanid solutions, for the purpose of extracting their gold and silver content.

My invention is applicable, not only to the treatment of ores and tailings containing gold and silver alone, but also to such ores and tailings as contain, in addition to gold and silver, such ammonia-soluble metals as copper, zinc, nickel and cobalt.

The object of my invention is to effect economy in the process; and, to this end, my invention consists in the treatment of the ores and tailings with a solution of ammonia and an alkaline earth-metal cyanid, as I shall now fully describe.

In the treatment of ordinary gold and silver bearing ores and tailings by the cyanid process, a cyanid solvent must be used which is not only stable in dilute solutions, such as 0.05% to 0.50% KCy, but must withstand exposure to the atmosphere as well, without decomposition. It must also not contain impurities, such as sulfids, carbids, etc., which would greatly depress the gold and silver extraction co-efficient of the cyanid solvent. The cyanids ordinarily used, therefore, are the potassium and sodium salts, KCy and NaCy. These are highly refined, snow-white and almost chemically pure. In this state they are sent to market for precious metal extraction purposes, and are, necessarily, very costly, from 20 to 25 cents per pound. In recent years, however, there has been great development in the cheap production of alkaline earth-metal cyanids, such as calcium cyanid, $Ca(Cn)_2$, and barium cyanid, $Ba(Cn)_2$, by means of the electric furnace, from atmospheric nitrogen. I have found that these electric furnace products, even impure as they are, if they contain 80% to 90% of the theoretical quantity of cyanogen $(Cn)_2$, are available for and may be adopted and used in ammonia solutions, as gold and silver solvents.

In carrying out my invention, the crude calcium cyanid or barium cyanid is dissolved in ammonia solution of sufficient strength; the insoluble residue allowed to settle and the clear solution applied in the treatment of gold and silver bearing ores and tailings, not amenable to ordinary cyanid treatment, either on account of excessive cyanid comsumption due to cyanicides, or on account of percentage of metals such as copper, nickel, zinc or cobalt, which render inert the gold or silver solvent powers of a dilute cyanid solution (KCy or NaCy) such as is commonly used, and cause an excessive loss of the cyanid.

A working solution, according to my invention, may be made up as follows:—Solution of ammonia, 1% or less to 10% $(NH)_3$. Calcium cyanid or barium cyanid, 0.05% to 1%. If this solution be too alkaline, a salt of ammonia, such as the sulfate, may be added to counteract such excessive alkalinity. The treatment of the ores or tailings with this solution is carried out in any of the usual or known manners, as by leaching or agitating them with such solution; and, where the ores or tailings contain, in addition to the gold and silver values, such metals as copper, nickel, zinc or cobalt, all these metals including the gold and silver are simultaneously extracted, and the separation of the gold and silver afterwards effected in any ordinary manner.

It will be seen that by my improvement, a very cheap gold and silver solvent is obtained, which overcomes all the objections and conditions above referred to.

Having thus described my invention, what I claim as new and desire to secure by Letters Patent is,

1. The improvement in treating ores and tailings containing gold and silver, which consists in extracting the precious metals with a solution of ammonia and an alkaline earth-metal cyanid.

2. The improvement in treating copper, nickel, zinc and cobalt ores and tailings with gold and silver values, which consists in simultaneously extracting all the metals with a solution of ammonia and an alkaline earth-metal cyanid.

In testimony whereof I have signed my name to this specification in the presence of two subscribing witnesses.

DAVID MOSHER.

Witnesses:
N. A. ACKER,
D. B. RICHARDS.